US005963567A

United States Patent [19]
Veselka et al.

[11] Patent Number: 5,963,567
[45] Date of Patent: Oct. 5, 1999

[54] MULTI-WAVELENGTH LASER SOURCE

[75] Inventors: John J. Veselka, Freehold; Steven K. Korotky, Toms River, both of N.J.

[73] Assignee: Lucent Technologies, Inc., Murray Hill, N.J.

[21] Appl. No.: 08/799,330

[22] Filed: Feb. 13, 1997

[51] Int. Cl.⁶ .................................................... H01S 3/10
[52] U.S. Cl. ............................................. 372/21; 372/26
[58] Field of Search .................................. 372/21, 22, 26

[56] References Cited

U.S. PATENT DOCUMENTS

| | | | |
|---|---|---|---|
| 5,295,209 | 3/1994 | Huber | 372/26 |
| 5,596,667 | 1/1997 | Watanabe | 372/21 |
| 5,778,015 | 7/1998 | Gunning et al. | 372/26 |

OTHER PUBLICATIONS

M.G. Young, U. Koren, B.I. Miller, M. Chien, T.L. Koch, D.M. Tennant, K. Fedder, K. Dreyer, and G. Raybon, "Six wavelength laser array with integrated amplifier and modulator," Electron. Lett., vol. 31, no.21, pp. 1835–1836, Oct. 12,1995.

T. Morioka, "Supercontinuum lightwave optical sources for large capacity transmission,"in Proc. 2 1 st. Eur. Conf. On Opt. Commun., Brussels, 1995, paper Th. A. 1.2, p. 821–828, no month.

H. Yasaka, Y. Yoshikuni, K. Sato, H. Ishii, and H. Sanjoh, "Multiwavelength light source with precise frequency spacing using mode–locked semiconductor laser and arrayed waveguide grating filter," in Tech. Dig. Conf. on Opt. Fiber Commun., San Jose, 1996, paper FB2, pp. 299–300, no month.

T. Saitoh, M. Kourogi, and M. Ohtsu, "A waveguide–type optical–frequency comb generator," IEEE Photon. Technol. Lett., vol. 7, no. 2, pp. 197–199, Feb. 1995.

E. A. Swanson and S. R. Chinn, "40–GHz pulse train generation using soliton compression of a Mach–Zehnder modulator output," IEEE Photon. Technol. Lett., vol. 7, no. 1, pp. 1 14–116, Jan. 1995.

J. J. Veselka and S. K. Korotky, "A multi–wavelength source having precise channel spacing based on external modulation and fiber Kerr nonlinearity, " in Tech. Dig. Conf. on Opt. Fiber Commun., Dallas, TX, 1997, paper ThM5, no month.

K. Noguchi, O. Mitomi, and H. Miyazawa, "Low–voltage and broadband Ti:LiNbO3 modulators operating in the millimeter wavelength region," in Tech. Dig. Conf. On Opt. Fiber Commun., San Jose, 1996, paper ThB2, pp. 205–206, no month.

*Primary Examiner*—Rodney Bovernick
*Assistant Examiner*—Robert E. Wise

[57] ABSTRACT

A light source for generating many precisely spaced wavelength channels, based on the periodic modulation of light. CW light is periodically amplitude modulated and then coupled to a non-linear fiber where it undergoes additional modulation by the process of self-phase modulation or other non-linear effects. In a general embodiment of the multi-wavelength source (MWS), an optical modulator driven by a periodic electromagnetic signal imposes periodic amplitude modulation on light from a single longitudinal mode CW laser. The light is then coupled to a non-linear medium with an intensity dependent refractive index where it generates higher order spectral sidebands by the process of self-phase modulation and/or other non-linear effects. The frequency spacing between the spectral components is equal to the repetition rate of the modulation. The shape of the spectrum (i.e. the relative amplitudes of the spectral components) can be modified by adjustments to: the amplitude modulated waveform; the optical power of the waveform when coupled to the non-linear medium; and/or characteristics of the non-linear medium such as the non-linear refractive index, the length and the dispersion.

20 Claims, 7 Drawing Sheets

MULTI-WAVELENGTH LASER SOURCE

FIELD OF THE INVENTION

The invention pertains to the field of laser light sources. More particularly, the invention pertains to sources of multiple wavelengths of coherent light for Wavelength Division Multiplexed (WDM) optical communications systems.

BACKGROUND OF THE INVENTION

Wavelength-Division-Multiplexing (WDM) is an attractive option for providing increased capacity in light wave transmission systems and routing capability within optical networks. For example, high capacity transport systems that carry as many as eight wavelengths per fiber have been developed and are currently being deployed. Presently in these systems, each transmitter includes a laser that is intended to operate at only one of the allowed wavelength channel frequencies. The lasers are engineered to operate within the channel specifications for the life of the system by both tight control of the laser fabrication and its operating environment. To plan for the event of a failure, an inventory of transmitters for each wavelength channel must also be maintained. As undoubtedly the demand for the number of wavelengths in transport and local systems will increase to 32 or more in the not too distant future, new technological capabilities and designs for transmitters and receivers will be required to minimize the complexity and cost of the use of such large numbers of wavelengths.

Several approaches to address the channel stabilization and inventory issues are being considered. One solution to the inventory problem is to use a tunable laser that can be adjusted to the desired channel within each transmitter. However, tunable lasers are more complicated than fixed frequency lasers, will naturally drift over a wider range, and will require stabilization of the operating wavelength for each of a large number of channels. A very attractive solution to the inventory and stabilization dilemma is to use a wavelength selectable laser. In this case, each photonic source chip includes several fixed frequency lasers, which the desired channel may be selected from. Wavelength selectable source chips that can reach 4–6 channels have been reported (see M. G. Young, U. Koren, B. I. Miller, M. Chien, T. L. Koch, D. M. Tennant, K. Fedder, K. Dreyer, and G. Raybon, "Six wavelength laser array with integrated amplifier and modulator," Electron. Lett., vol. 31, no.21, pp. 1835–1836, Oct. 12, 1995), however reaching larger numbers would presumably present significant yield and packaging issues.

Recently, an alternative approach to multi-wavelength sources that can generate many or all of the system wavelengths has been reported. A multi-wavelength source that has been used in many return-to-zero system experiments is the super-continuum laser in which the discrete spectrum of optical pulses from a mode-locked fiber laser is broadened and made continuous by non-linear processes in a dispersion-shifted fiber (DSF)(T. Morioka, "Supercontinuum lightwave optical sources for large capacity transmission," Proc. 21 st. Eur. Conf. On Opt. Commun., Brussels, 1995, paper Th.A.1.2, pp. 821–828). The desired wavelength channels are then selected with an optical filter. These wavelength channels are not CW but pulsed and, therefore, are useful only for return-to-zero systems.

A procedure that generates a spectrum with a precise and stable frequency spacing between the components, or wavelength channels, is the periodic modulation of light. In this case the channel spacing is equal to the repetition rate of the modulation. However, it is difficult to modulate light at the required frequencies of greater than several tens of GHz and of a sufficient magnitude to produce many useful wavelength channels. A reported variation of this approach employed a monolithic mode-locked laser to produce pulses at a repetition rate of 50 GHz and, hence, discrete CW frequency components with a separation of 50 GHz (H. Yasaka, Y. Yoshikuni, K. Sato, H. Ishii, and H. Sanjoh, "Multiwavelength light source with precise frequency spacing using mode-locked semiconductor laser and arrayed waveguide grating filter," in Tech. Dig. Conf. on Opt. Fiber Commun., San Jose, 1996, paper FB2, pp. 299–300).

Another variation of the modulation technique is to couple CW light from a laser into an optical resonator which contains an optical phase modulator to modulate the cavity length (T. Saitoh, M. Kourogi, and M. Ohtsu, "A waveguide-type optical-frequency comb generator," IEEE Photon. Technol. Lett., vol. 7, no. 2, pp. 197–199, February 1995). For efficient operation, both the mode-locked laser and optical resonator techniques require that the modulation frequency be an integer multiple of the free spectral range of the cavity, thereby, placing stringent requirements on the cavity length and modulation frequency.

SUMMARY OF THE INVENTION

The invention provides a novel method for generating many precisely spaced wavelength channels, based on the periodic modulation of light. The invention does not impose severe length or modulation frequency requirements on the components. CW light is periodically amplitude modulated and then coupled to a non-linear fiber where it undergoes additional modulation by the process of self-phase modulation and other non-linear effects. A multi-wavelength source of CW wavelength channels that uses a CW laser, an amplitude modulator, and self-phase modulation in a length of optical fiber is provided.

In a general embodiment of the multi-wavelength source (MWS) of CW wavelength channels, an optical modulator driven by a periodic signal imposes periodic amplitude modulation on light from a single longitudinal mode CW laser. The light is then coupled to a non-linear medium with an intensity dependent refractive index where it generates higher order spectral components by the process of self-phase modulation, as well as by other non-linear effects. The frequency spacing between the spectral components is equal to the repetition rate of the modulation. The shape of the spectrum (i.e. the relative amplitudes of the spectral components) can be modified by adjustments to the amplitude modulated waveform; the optical power of the waveform, when coupled to the non-linear medium; and/or characteristics of the non-linear medium such as the non-linear refractive index, the length and the dispersion.

DESCRIPTION OF THE PREFERRED EMBODIMENT

Figure 1:
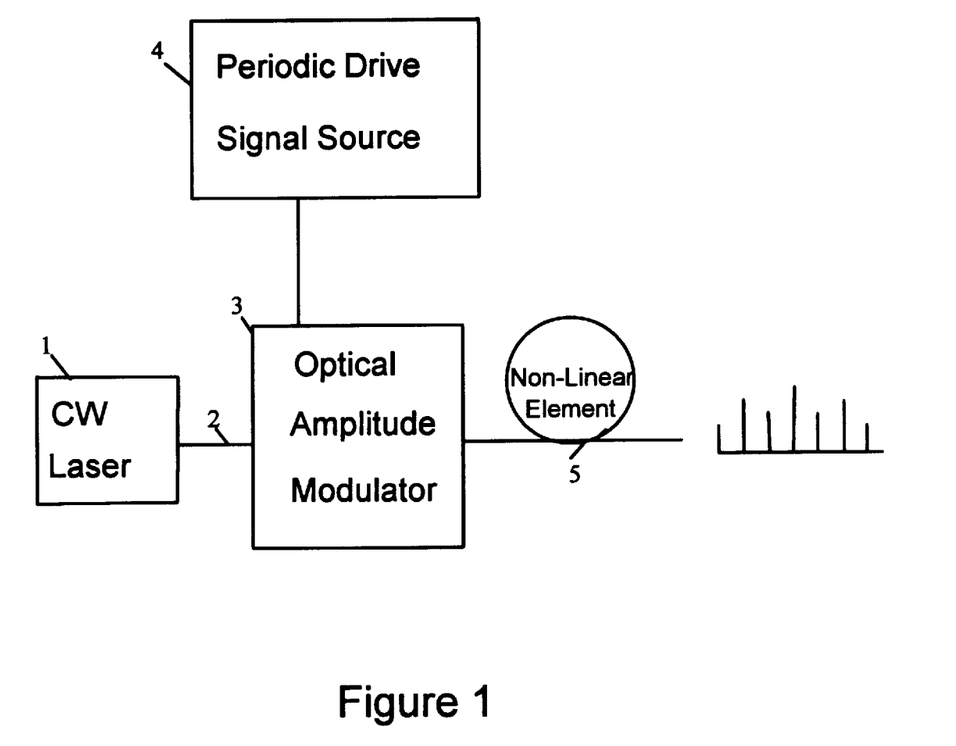
FIG. 1 shows a block diagram of the invention in its most general form.

A general embodiment of the multi-wavelength source (MWS) is shown in FIG. 1 and operates as follows.

An optical modulator (3) driven by a periodic signal (4) imposes periodic amplitude modulation on light (2) from a single longitudinal mode CW laser (1). The light is then coupled to a non-linear medium (5) with an intensity dependent refractive index where it generates higher order spectral sidebands by the process of self-phase modulation. The frequency spacing between the spectral components is equal to the repetition rate of the modulation. The shape of the spectrum (i.e. the relative amplitudes of the spectral components) can be modified by adjustments to: the amplitude modulated waveform; the optical power of the waveform. when coupled to the non-linear medium; and/or characteristics of the non-linear medium such as the non-linear refractive index, the length and the dispersion.

Figure 2:
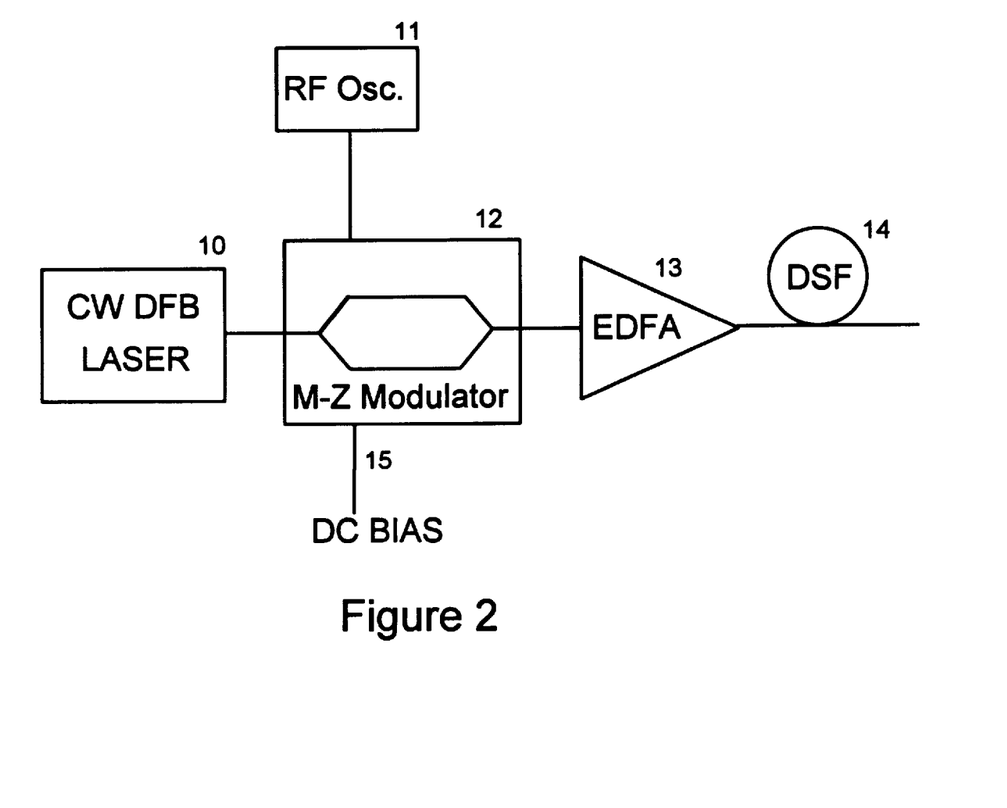
FIG. 2 shows a more specific block diagram of the invention.

The basic configuration of a practical MWS is shown in FIG. 2. A similar configuration has been used by others to generate optical soliton pulses for use in a soliton transmission system (E. A. Swanson and S. R. Chinn, "40-GHz Pulse Train Generation Using Soliton Compression of a Mach-Zehnder Modulator Output," IEEE Photon. Technol. Lett., vol. 7, no. 1, pp. 114–116, January 1995). The present invention comprises the use of this arrangement as a multi-wavelength source, an effective and novel system for generating a plurality of spaced-apart wavelength coherent light signals from a single laser source. Two alternative methods to attain the periodic amplitude modulated optical signal are described.

It should be noted that it is a periodic amplitude modulated signal which is required, and that where the term "sinusoidal" signal is used herein, the teachings of the invention are intended to encompass not just purely sinusoidal signals but other periodic signal waveforms as well.

In a first embodiment of the invention a lithium niobate Mach-Zehnder interferometer modulator (12) was used to generate the periodic amplitude modulation on the CW light from a distributed-feedback laser (DFB) (10). To generate a purely amplitude modulated optical signal, the electrode on each of the two arms of the modulator (12) were driven with 16 GHz sinusoidal electrical signals of opposite polarity and equal magnitude from an RF Oscillator (11). A DC bias voltage (15) was applied to the modulator to bias it at a maximum of its raised cosine switching characteristic and, thereby, generate periodic amplitude modulation at a repetition rate of 32 GHz. This amplitude modulated light was amplified to 53 mW using an erbium-doped fiber amplifier (EDFA) (13) and coupled to 22.6 km of dispersion-shifted fiber (DSF) (14). In the alternative, a directional-coupler type amplitude modulator might be used in place of the Mach-Zender modulator.

Figure 3A:
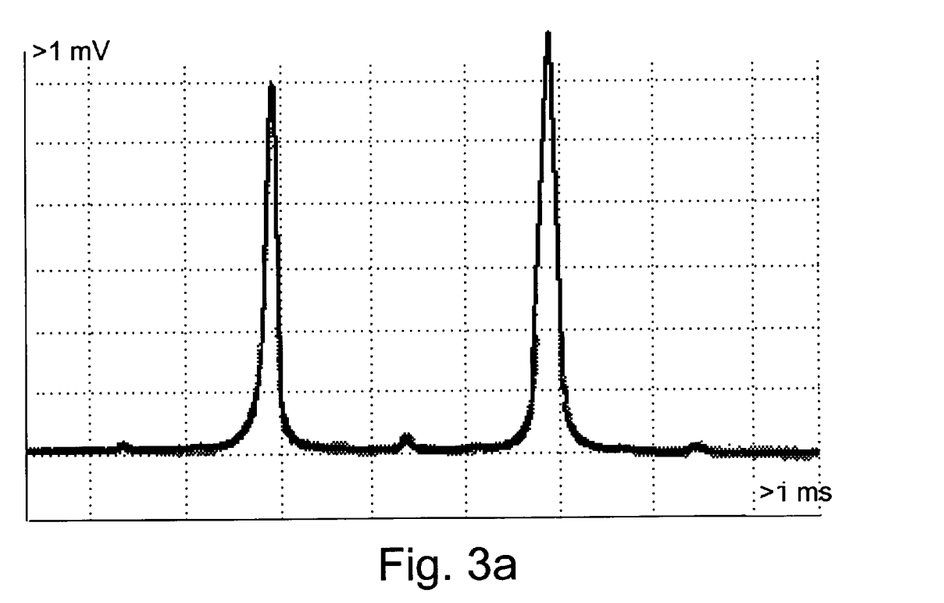
FIG. 3a shows the spectrum of the light at the input to the DSF as measured by a Fabry-Perot spectrometer.
Figure 3B:
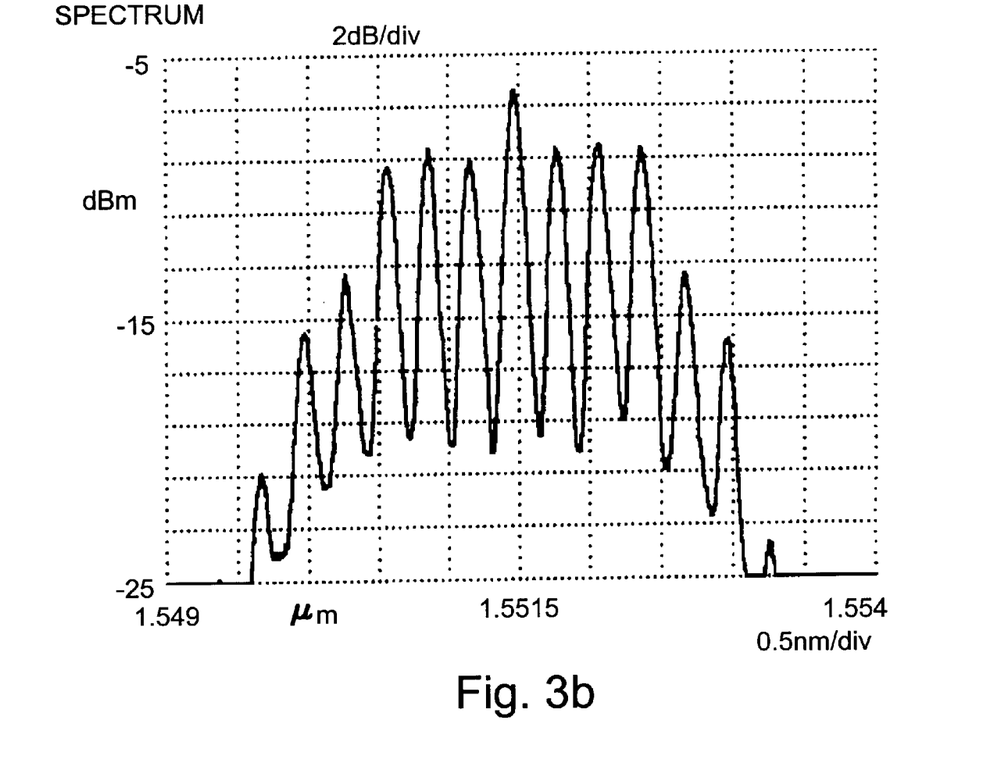
FIG. 3b shows the spectrum at the output of the DSF as measured by an optical spectrum analyzer.

FIG. 3a shows the spectrum of the light at the input to the DSF as measured by a Fabry-Perot spectrometer and FIG. 3b was the spectrum at the output of the DSF as measured by an optical spectrum analyzer. As can be seen in FIG. 3a, the optical spectrum coupled to the DSF consisted of only two significant components spaced 64 GHz apart.

At the DSF output, as can be seen in FIG. 3b, the spectrum contained seven components within 3 dB in amplitude and eleven components within 10 dB. These spectral components were separated by 32 GHz—which is the repetition rate of the amplitude modulation and twice the modulator drive frequency. The quality of the wavelength channels produced by the MWS were evaluated by selecting a channel with an optical filter, modulating it at 2.5 Gb/s, and testing for errors. The four wavelength channels tested had less than a 0.4 dB penalty as compared to using the CW light of a DFB laser as the optical source.

Figure 4:
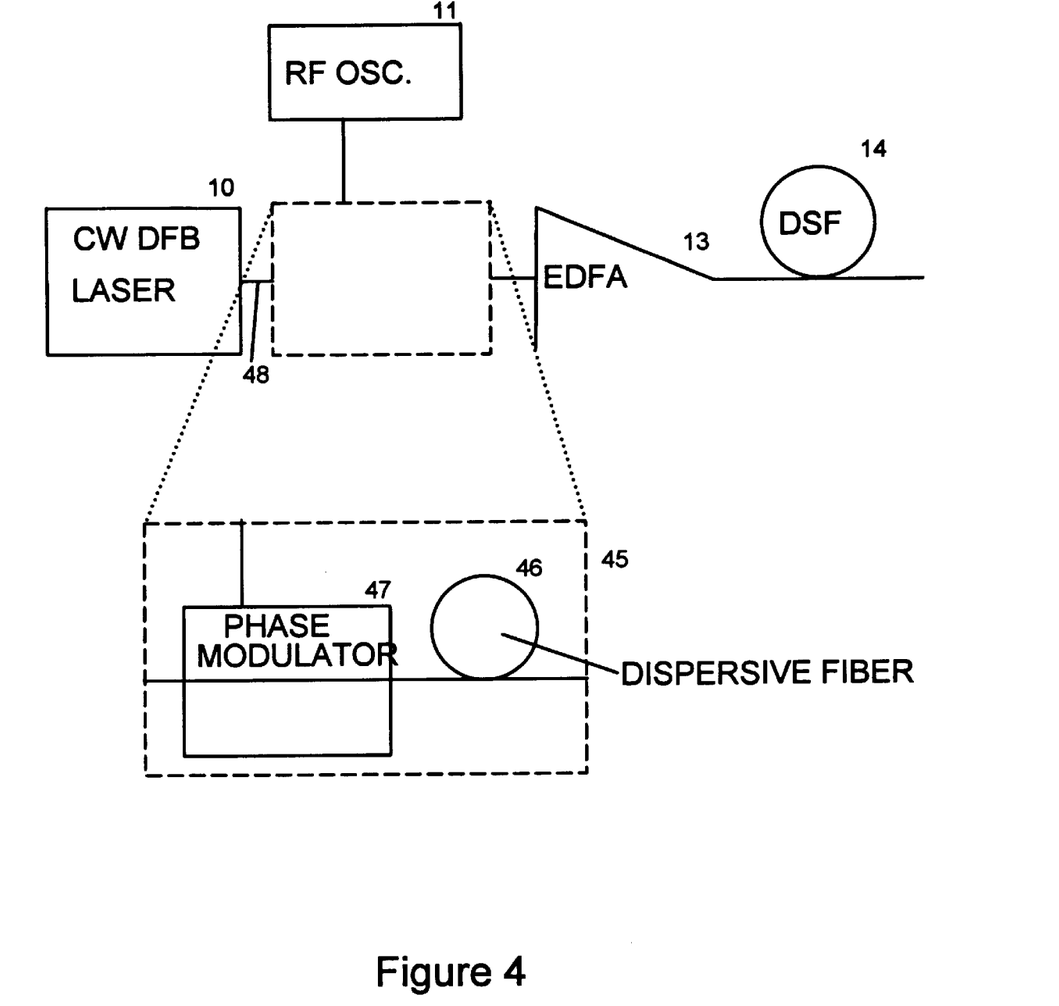
FIG. 4 shows another embodiment of the invention, in which the amplitude modulator comprises a periodically driven phase modulator and linear dispersive fiber.

An alternative method of generating the periodic amplitude modulation is to periodically phase modulate the CW light and then convert it to amplitude modulation using a linear dispersive element, as is presented in FIG. 4.

Figure 5A:
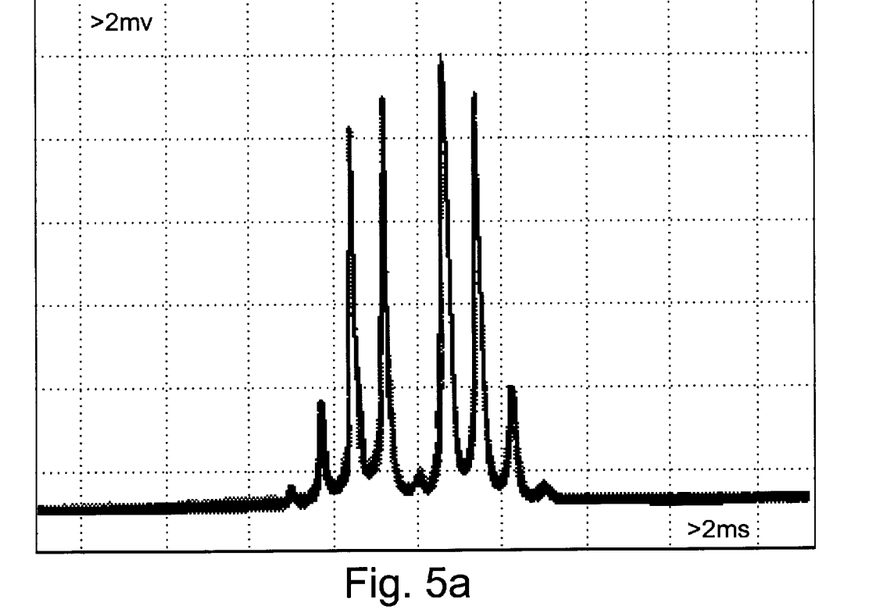
FIG. 5a shows the optical signal spectrum from FIG. 4.
Figure 5B:
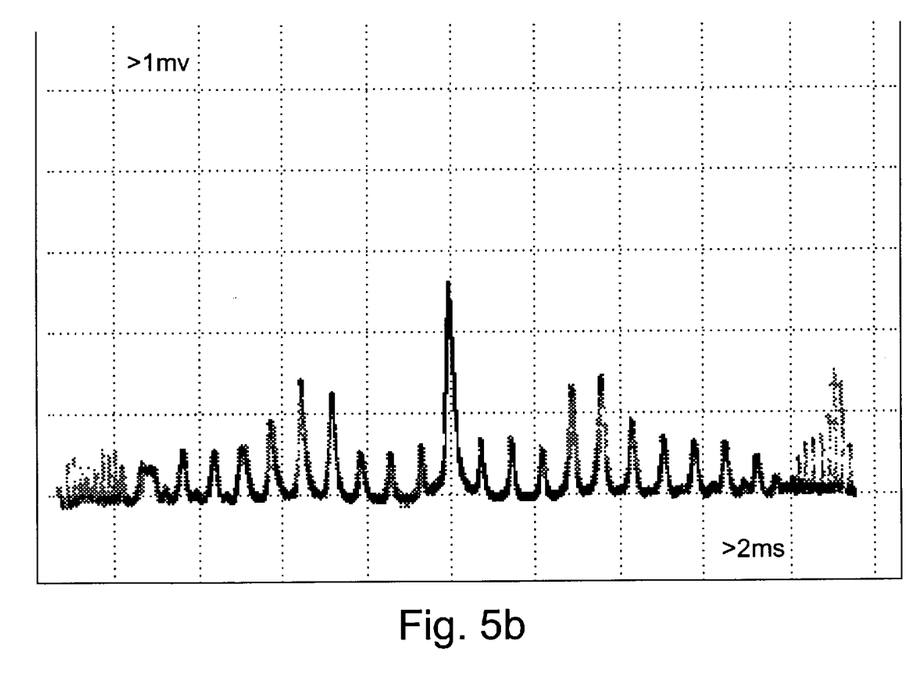
FIG. 5b shows the spectrum of the output light of the embodiment of FIG. 4.

In this embodiment, the amplitude modulator of FIG. 2 (15) is replaced with a modulator (45) which comprises a sinusoidally driven phase modulator (47) and linear dispersive fiber (46) as shown in FIG.4. CW light from a DFB laser (10) is coupled through an optical fiber (48) to an electro-optic phase modulator (47) that is driven by sinusoidal electrical signals from an RF oscillator (11). The periodic phase modulated optical signal is coupled to a linear dispersive optical fiber (46) which converts it to a periodic amplitude modulated optical signal. The periodic amplitude modulated optical signal is coupled to an EDFA (13) in which it is amplified. The amplified optical signal is then coupled to a DSF (14) which generates additional frequency components in the spectrum of the optical signal by the process of self-phase modulation. This configuration allows the production of a spectrum at the input end of the DSF (14) with more spectral components, although the frequency doubling feature of the Mach-Zehnder modulator is sacrificed. The optical signal, whose spectrum is shown in FIG. 5a, was amplified to 63 mW and coupled to the DSF (14). As shown in FIG. 5b, the spectrum of the output light contained 21 spectral components within 10 dB in amplitude and, if the carrier is neglected, had 20 components within 6 dB. Here, the spectral components were spaced by 12 GHz which was the drive frequency of the modulator.

Figure 6:
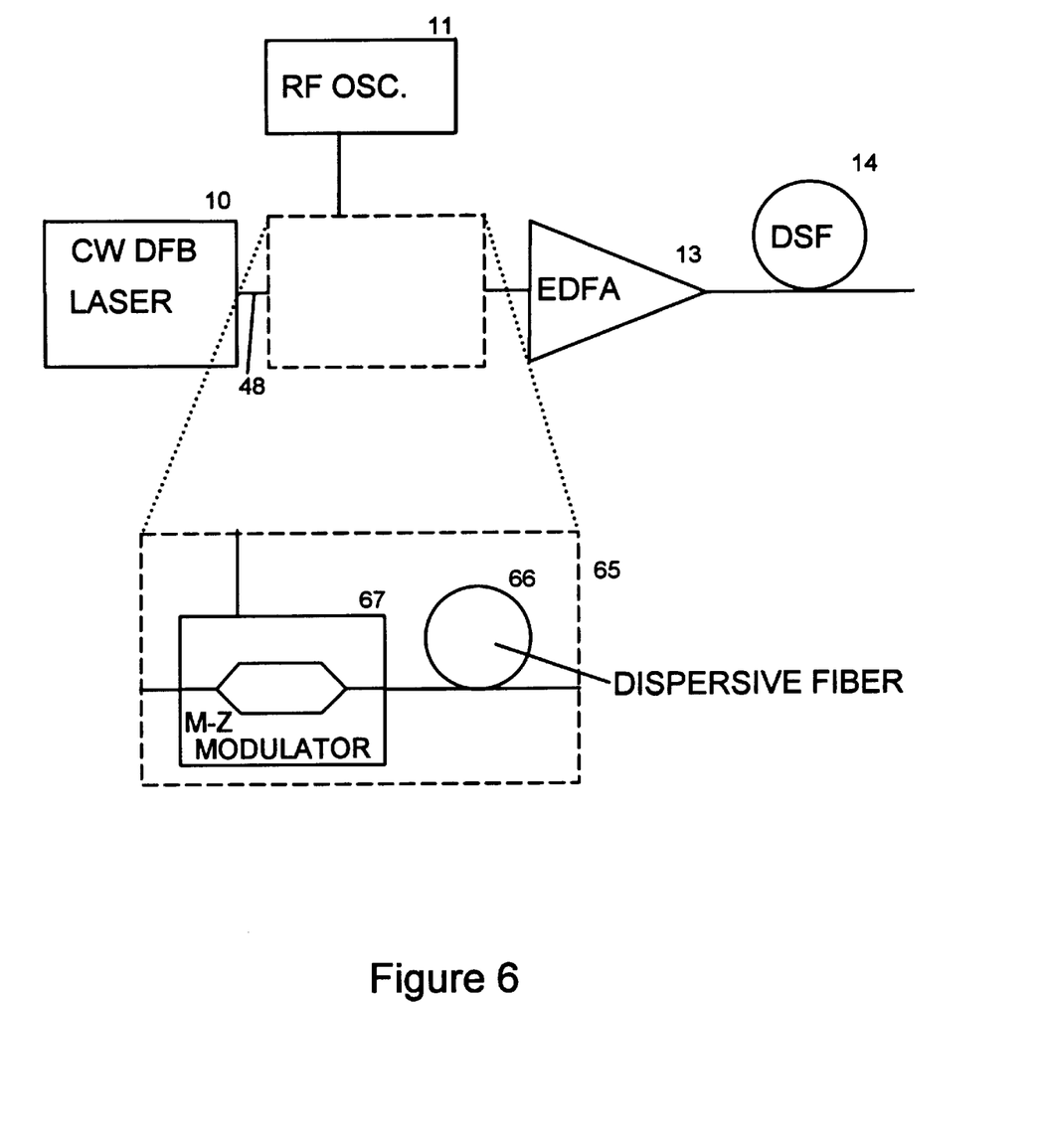
FIG. 6 shows a second alternative embodiment, in which the periodic amplitude modulation is generated by inserting a linear dispersive element after the Mach-Zehnder modulator to modify the amplitude modulated waveform.

A second alternative method of generating the periodic amplitude modulation is shown in FIG. 6. In this embodiment a linear dispersive element (66) is inserted after the Mach-Zehnder modulator (67) in the modulator (65) to modify the amplitude modulated waveform. The M-Z modulator (67) is driven to generate an optical signal with a spectrum consisting predominantly of two components spaced in frequency by 4×f where f is the frequency of electrical drive frequency. This is achieved if the peak-to-peak phase modulation induced in each arm of the M-Z modulator (67) is from about 4.2 to 4.8 radians. The optical signal is then coupled to a linear dispersive element (66) with first order dispersion equal to $\pm c/(8\lambda^2 f^2)$ or $\pm c/(24\lambda^2 f^2)$ and negligible higher order dispersion. Here c is the speed of light in a vacuum and λ is the wavelength of the CW light. These amounts of dispersion convert the optical signal to one in which the repetition rate of the amplitude modulation is 4×f. The non-linear fiber will generate more major frequency spectral components spaced by 4×f, although midway between the major components will be a minor component of ≦0.1 the power of the maximum component.

In the techniques describe above, the spectral shape is largely independent of the repetition rate. Therefore, spectra similar to those we generated could be generated with larger channel spacings. A Mach-Zehnder modulator with a 3 dB electrical bandwidth of 60 to 70 GHz and a half-wave voltage of 5.1 V has been reported (K. Noguchi, O. Mitomi, and H. Miyazawa, "Low-voltage and broadband Ti:LiNbO$_3$ modulators operating in the millimeter wavelength region." Tech. Dig. Conf. On Opt. Fiber Commun., San Jose, 1996, paper ThB2, pp. 205–206). A dual-drive version of that modulator whose electrodes are driven by 50 GHz sinusoidal signals of only 300 mW would be able to produce the first spectrum described above but with a 100 GHz spacing between the components. Driving such a modulator harder would generate a spectrum with more components.

Figure 7:
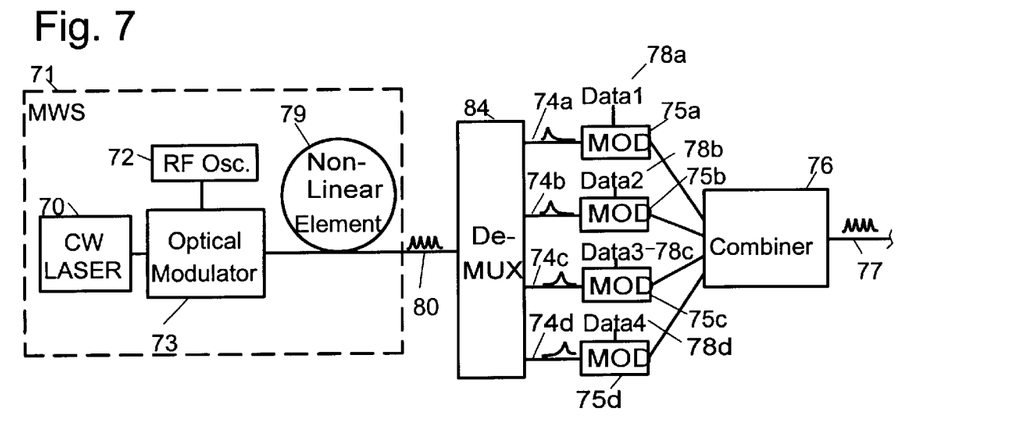
FIG. 7 shows a block diagram of the invention in use in a four-channel WDM data transmitter.

FIG. 7 shows how the multi-wavelength source (MWS) of the invention (71) is used in a wavelength-division multiplex (WDM) transmitter, here shown with four channels, although it will be understood that any number of channels could be used. The MWS (71), as discussed above, is made up of a CW laser (70) feeding an optical modulator (73) such as a Mach-Zender modulator, which is modulated by a periodic source such as RF oscillator (72), which has an RF output frequency f of, for example, 32 GHz. The output of the modulator (73) is fed into a non-linear element (79), such as a length of dispersion-shifted fiber. The output (80) of the MWS (71) is made up of a plurality of optical light signals, with wavelengths separated by f or, in some configurations, a multiple of f.

The output (80) of the MWS (71) is preferably fed into wavelength-division demultiplexer (DeMUX)(84), which separates each of the components of the MWS into single-wavelength optical output (74a)–(74d). Each output of the DeMUX (74a)–(74d) is fed into an optical modulator (75a)–(75d). Each modulator (75a)–(75d) is fed with a separate data signal (78a)–(78d), one data signal per channel in the WDM system. The outputs of the modulators (75a)–(75d), each comprising a modulated optical signal representing one channel of data in the WDM system, are combined in a combiner (76) or wavelength multiplexer, and sent out over the optical fiber (77). If desired, however, the various signals could be kept separate and not combined.

It should be noted that, if desired, a plurality of band-pass filters (BPF), each tuned to a different one of the plurality of light wavelengths in the MWS output (80), could be used in place of the DeMUX.

It is anticipated that, although at the present time 4- or 8-channel WDM systems are in use, in the future 16- or 32-channel systems will become common. Additional channels can be added to the four shown by simply adding more BPF/modulator combinations.

Figure 8:
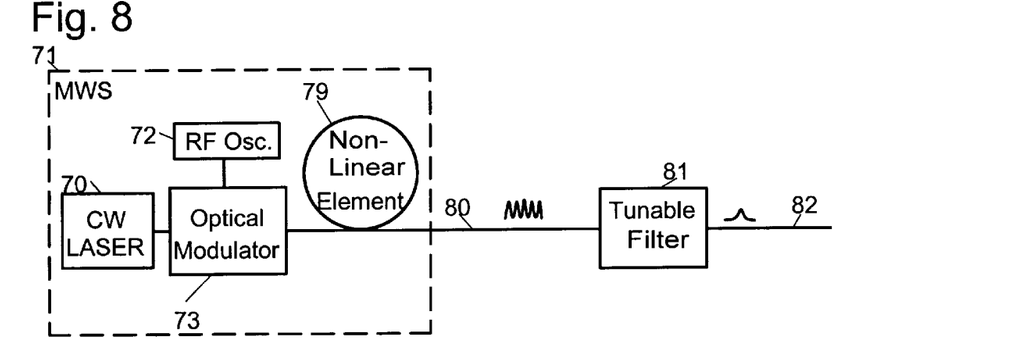
FIG. 8 shows a block diagram of the invention used as a tunable light source.

The MWS of the invention can also be used to form a tunable light source, as shown in FIG. 8. The elements of the MWS (71) are the same as discussed above. The output (80) of the MWS (71), as noted above, comprises a plurality of optical light signals of differing wavelengths, spaced apart by the frequency f of the RF oscillator (72) (or by a multiple of f).

If the output (80) is fed into a tunable filter (81), then one of the plurality of light signals may be selected out, and output (82) into other equipment which might need a light source of that wavelength (color). This would enable the MWS of the invention to be used, for example, as an economical backup to the single-wavelength lasers used in conventional WDM systems, alleviating the need to stock multiple backup lasers.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A multi-wavelength light source for producing laser light having a plurality of wavelengths, comprising:

a laser having a continuous wave light output;

a source of periodic electromagnetic signals having a signal output having a characteristic repetition rate;

an optical modulator having a light input coupled to the light output of the laser, a modulating input coupled to the signal output of the source, and a light output, such that the light output of the optical modulator comprises the light from the light input, modulated by the output of the source introduced at the modulating input;

a non-linear element having a light input coupled to the light output of the optical modulator and a light output; and a length of dispersive fiber having a first end coupled to the output of the optical modulator and a second end coupled to the input of the non-linear element, such that the waveform from the optical modulator is modified by the dispersive fiber;

the dispersive fiber having a first order dispersion equal to $\pm c/(8\lambda^2 f^2)$ or $\pm c/(24\lambda^2 f^2)$ and negligible higher order dispersion, where c is the speed of light in a vacuum, f is the repetition rate of the periodic signal and $\lambda$ is the wavelength of the light;

such that the light output of the non-linear element comprises a plurality of optical signals, spaced apart by a wavelength related to the characteristic repetition rate of the source.

2. A multi-wavelength light source for producing laser light having a plurality of wavelengths, comprising:

a laser having a continuous wave light output;

a source of periodic electromagnetic signals having a signal output having a characteristic repetition rate;

a Mach-Zender optical modulator generating an amplitude modulated optical signal, having a light input coupled to the light output of the laser, a modulating input coupled to the signal output of the source, and a light output, such that the light output of the optical modulator comprises the light from the light input, modulated by the output of the source introduced at the modulating input; and a non-linear element having a light input coupled to the light output of the optical modulator and a light output;

such that the light output of the non-linear element comprises a plurality of optical signals, spaced apart by a wavelength related to the characteristic repetition rate of the source;

in which the peak-to-peak phase modulation induced in each arm of the Mach-Zender modulator is between 4.2 and 4.8 radians.

3. A multi-wavelength light source for producing laser light having a plurality of wavelengths, comprising:

a laser having a continuous wave light output:

a source of periodic electromagnetic signals having a signal output having a characteristic repetition rate;

a Mach-Zender optical modulator generating an amplitude modulated optical signal, having a light input coupled to the light output of the laser, a modulating input coupled to the signal output of the source, and a light output, such that the light output of the optical modulator comprises the light from the light input, modulated by the output of the source introduced at the modulating input; and a non-linear element having a light input coupled to the light output of the optical modulator and a light output;

such that the light output of the non-linear element comprises a plurality of optical signals, spaced apart by a wavelength related to the characteristic repetition rate of the source;

in which the Mach-Zehnder modulator is biased at a maximum on its switching characteristic.

4. A multi-wavelength light source for producing laser light having a plurality of wavelengths, comprising:

a laser having a continuous wave light output;

a source of periodic electromagnetic signals having a signal output having a characteristic repetition rate;

a Mach-Zender optical modulator generating an amplitude modulated optical signal, having a light input coupled to the light output of the laser, a modulating input coupled to the signal output of the source, and a light output, such that the light output of the optical modulator comprises the light from the light input, modulated by the output of the source introduced at the modulating input; and a non-linear element having a light input coupled to the light output of the optical modulator and a light output;

such that the light output of the non-linear element comprises a plurality of optical signals, spaced apart by a wavelength related to the characteristic repetition rate of the source;

in which the two arms of the the Mach-Zehnder modulator are driven sinusoidally such that a sinusoidal phase modulation of about 4.2 to 4.8 radians peak-to peak magnitude and of opposite polarity is induced each arm of the modulator.

5. A multi-wavelength light source for producing laser light having a plurality of wavelengths, comprising:

a laser having a continuous wave light output;

a source of periodic electromagnetic signals having a signal output having a characteristic repetition rate;

a directional coupler amplitude modulator, having a light input coupled to the light output of the laser, a modulating input coupled to the signal output of the source, and a light output, such that the light output of the optical modulator comprises the light from the light input, modulated by the output of the source introduced at the modulating input; and a non-linear element having a light input coupled to the light output of the modulator and a light output;

such that the light output of the non-linear element comprises a plurality of optical signals, spaced apart by a wavelength related to the characteristic repetition rate of the source.

6. A multi-wavelength light source for producing laser light having a plurality of wavelengths, comprising:

a laser having a continuous wave light output;

a source of periodic electromagnetic signals having a signal output having a characteristic repetition rate;

an optical modulator having a light input coupled to the light output of the laser, a modulating input coupled to the signal output of the source, and a light output, such that the light output of the optical modulator comprises the light from the light input, modulated by the output of the source introduced at the modulating input;

in which the optical modulator comprises:

a phase modulator having a light input, a modulation input, and a light output, the light input forming the light input of the optical modulator, the modulation input comprising the modulating input of the optical modulator, the light signal at the light output comprising the light from the light input phase modulated by the signal from the modulating input;

a length of dispersive fiber, having a first end coupled to the light output of the phase modulator and a second end comprising the light output of the optical modulator;

such that the phase modulated light output of the phase modulator is converted to a periodic amplitude modulated optical signal by the dispersive fiber; and a non-linear element having a light input coupled to the light output of the optical modulator and a light output;

such that the light output of the non-linear element comprises a plurality of optical signals, spaced apart by a wavelength related to the characteristic repetition rate of the source.

7. A method of producing a plurality of light signals of spaced-apart wavelength, the wavelength being related to the frequency of a periodic signal, comprising the steps of:

producing a single wavelength of coherent light in a continuous-wave laser;

modulating the light in an optical modulator with a periodic electromagnetic signal;

introducing the modulated light into a non-linear element, such that the modulated light generates higher-order spectral components through non-linear effects in the non-linear element;

supplying the multi-wavelength light output from the non-linear element into a plurality of band-pass filters, each band-pass filter being tuned to one of the plurality of wavelengths of light;

modulating the output of each of the plurality of band-pass filters in an optical modulator with a channel of data.

8. The method of claim 7, in which the optical modulator is an amplitude modulator.

9. The method of claim 7, in which the optical modulator is a phase modulator followed by a length of dispersive fiber.

10. The method of claim 7, further comprising the step of combining the modulated light outputs of the plurality of optical modulators, the combined output comprising a multi-channel wavelength-division multiplexed signal.

11. The method of claim 7, further comprising the steps of:

filtering the light from the non-linear element in a tunable band-pass filter;

tuning the tunable band-pass filter to one of the plurality of wavelengths of light in the light from the non-linear element.

12. A method of producing a plurality of light signals of spaced-apart wavelength, the wavelength being related to the frequency of a periodic signal, comprising the steps of:

producing a single wavelength of coherent light in a continuous-wave laser;

modulating the light in an optical modulator with a periodic electromagnetic signal;

introducing the modulated light into a non-linear element, such that the modulated light generates higher-order spectral components through non-linear effects in the non-linear element;

supplying the multi-wavelength light output from the non-linear element into a wavelength demultiplexer having a plurality of outputs, each output being tuned to one of the plurality of wavelengths of light; and modulating each of the plurality of outputs of the wavelength demultiplexer in an optical modulator with a channel of data.

13. The method of claim 12, further comprising the step of combining the modulated light outputs of the plurality of optical modulators, the combined output comprising a multi-channel wavelength-division multiplexed signal.

14. The method of claim 12, further comprising the steps of:

filtering the light from the non-linear element in a tunable band-pass filter;

tuning the tunable band-pass filter to one of the plurality of wavelengths of light in the light from the non-linear element.

15. The method of claim 12, in which the optical modulator is an amplitude modulator.

16. The method of claim 12, in which the optical modulator is a phase modulator followed by a length of dispersive fiber.

17. A wavelength division multiplex transmitter comprising:

a multi-wavelength source having a light output comprising a plurality of light signals of a plurality of wavelengths, the multi-wavelength source comprising:

a laser having a continuous wave light output;

a source of periodic electromagnetic signals having a signal output having a characteristic repetition rate;

an optical modulator having a light input coupled to the light output of the laser, a modulating input coupled to the signal output of the source, and a light output, such that the light output of the optical modulator comprises the light from the light input, modulated by the output of the source introduced at the modulating input; and a non-linear element having a light input coupled to the light output of the optical modulator and a light output;

such that the light output of the non-linear element comprises a plurality of optical signals, spaced apart by a wavelength related to the characteristic repetition rate of the source;

wavelength-separation means for separating an optical signal into a plurality of outputs based on the wavelength of the signal components, having an input coupled to the output of the multi-wavelength source, and a plurality of light outputs each comprising light having a wavelength, the wavelengths being chosen from the plurality of wavelengths of light in the light output of the multi-wavelength source; and a plurality of single-channel modulators, each comprising:

an optical modulator having an input coupled to a light output of the wavelength separation means, a modulation input, and a light output, the light output comprising the light present at the light input modulated by the data on the modulation input, the output of the optical modulator being the output of the single channel modulator.

18. The transmitter of claim 17, further comprising a combiner having a plurality of inputs coupled to the outputs of the plurality of single-channel modulators, the output of the combiner comprising the combination of the outputs of the single-channel modulators.

19. The transmitter of claim 17, in which the wavelength separation means is a wavelength demultiplexer.

20. The transmitter of claim 17, in which the wavelength separation means comprises a plurality of band-pass filters, each tuned to a wavelength chosen from the multiple wavelengths of the multi-wavelength source.

* * * * *